July 10, 1945.  F. H. CAMERON  2,380,291
DRILLING JIG
Filed Dec. 17, 1943
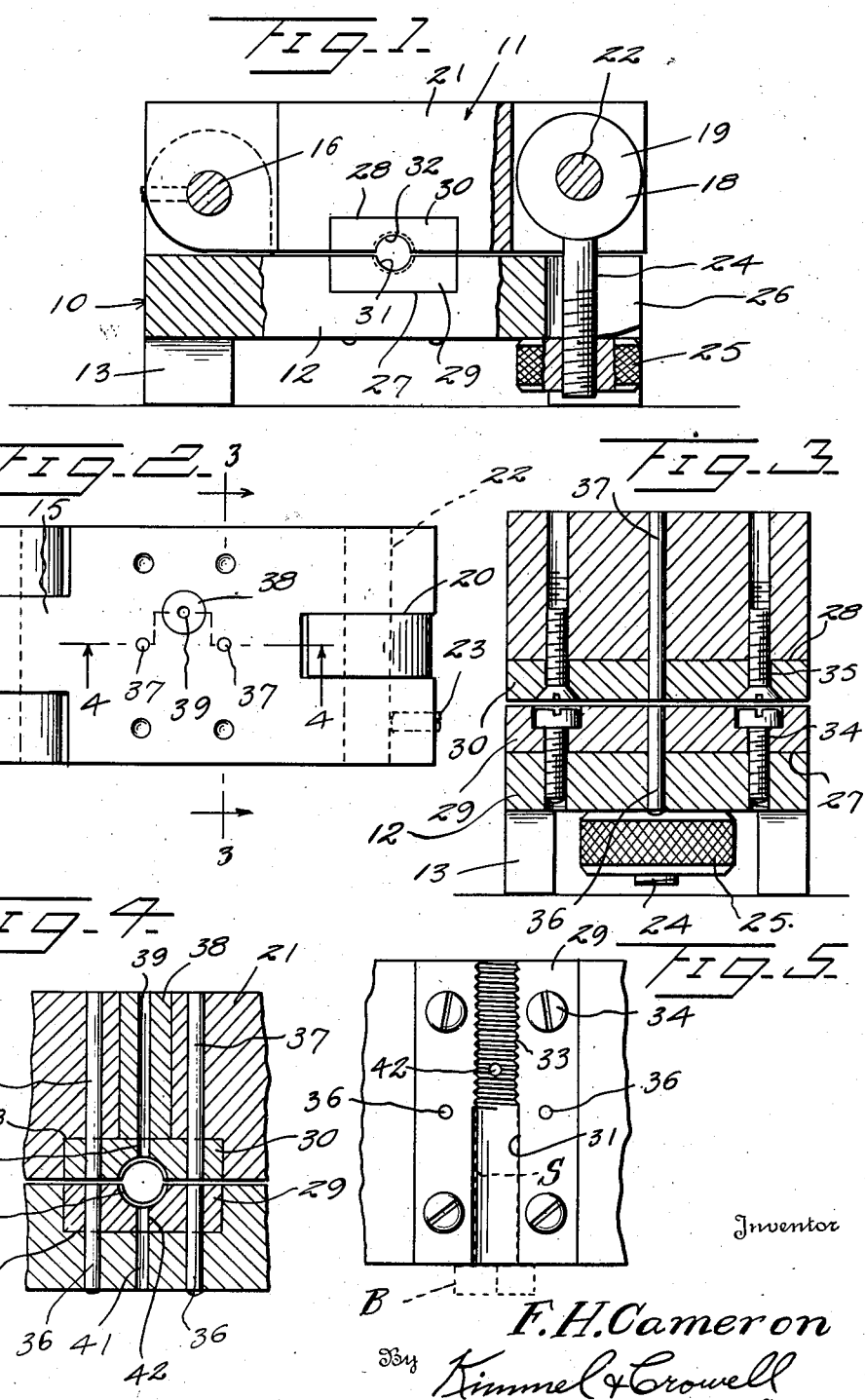
Inventor
F. H. Cameron
By Kimmel & Crowell
Attorneys Patented July 10, 1945

2,380,291

UNITED STATES PATENT OFFICE 2,380,291

DRILLING JIG

Fred H. Cameron, Corry, Pa., assignor to Aero Supply Mfg. Co. Inc., Corry, Pa.

Application December 17, 1943, Serial No. 514,682

2 Claims. (Cl. 77—62)

This invention relates to drilling jigs.

An object of this invention is to provide a jig or chuck whereby a transverse hole may be drilled through a bolt or similar round threaded article at a specific location, the jig or chuck being so constructed that the drill will not cause a burr to occur at one or both ends of the drilled hole.

This invention contemplates the provision of a pair of jaws pivotally connected together and each jaw having a changeable insert so that the device may be used for different sizes of articles, the jaws having aligned drill guide openings and the inserts having openings registering with the drill guide opening. Each insert is formed with a transversely arcuate groove having threads for at least a portion of the length of the groove, and the hole in each insert passing through the threads thereof, so that the inserts will firmly grip the article when the jaws are clamped together and it will not be possible to create a burr at the ends of the transverse hole formed in the article.

To the foregoing objects and others which may hereinafter appear, the invention consists of the novel construction, combination and arrangement of parts as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a detail side elevation partly broken away and in section of a drilling jig or chuck constructed according to an embodiment of this invention, Figure 2 is a plan view of the device, Figure 3 is a sectional view taken on the line 3—3 of Figure 2, Figure 4 is a fragmentary sectional view taken on the line 4—4 of Figure 2, and Figure 5 is a fragmentary top plan of the upper or inner side of the lower jaw.

Referring to the drawing, the numerals 10 and 11 designate generally a pair of work clamping jaws, the jaw 10 being a lower stationary jaw and the jaw 11 being an upper and movable or pivoted jaw. The lower jaw 10 has projecting from the body 12 thereof a plurality of supporting feet 13, and a pair of upwardly projecting ears 14 extend upwardly from one end of the body 12. The upper or movable jaw 11 is of substantially rectangular configuration in plan and is formed at the rear or one end thereof with a projecting lug 15 through which a pivot member 16 engages. The pivot member 16 also engages through the two ears 14 and is firmly secured against endwise movement with respect to the lug 15 by means of a set screw 17.

The upper jaw 11 is adapted to be held in a clamping position with respect to the lower jaw 10 by means of an eye bolt 18. The eye bolt 18 includes an eye 19 which is disposed in a slot 20 formed in the body 21 of the jaw 11 at the end opposite from the lug 15. A shaft or pin 22 is secured in the body 21 across the opening or slot 20 and loosely engages through the eye 19. The pin 22 is held against endwise movement by means of a set screw 23. The eye bolt 18 includes a shank 24 on which a nut 25 is threaded. The shank 24 is adapted to loosely engage in a slot 26 which is formed in the adjacent end of the body 12 of the lower jaw 10, and the nut 25 when in clamping position engages against the underside of the body 12.

The lower jaw body 12 is formed with a transversely extending channel or recess 27 and the upper jaw body 21 is formed with a complementary or confronting recess 28. An insert 29 is mounted in the recess 27 of the lower jaw and a complementary or confronting insert 30 is mounted in the recess 28. The insert 29 is formed with a transversely arcuate groove 31 in the upper side thereof and the insert 30 is formed with a transversely arcuate groove 32 which confronts the groove 31. The two grooves 31 and 32 as shown in Figure 5 are formed with a threaded portion 33 for a portion of the length of the insert so that a bolt B may have the shank S thereof disposed within the confronting grooves 31 and 32 and the threads of the bolt shank will engage the complementary threads of the inserts.

The insert 29 is removably secured in the recess 27 by means of cap screws or fastening members 34 and the insert 30 is removably mounted in the recess 28 by means of fastening devices 35. The insert 29 is initially positioned within the recess 27 by means of a pair of positioning pins 36 which extend through the insert 29 on opposite sides of the groove 31 and engage in the body 12 of the lower jaw.

The insert 30 is initially positioned at the desired point in the recess 28 by means of a pair of positioning pins 37 disposed on opposite sides of the groove 32 and extending through the insert 30 and into the body 21 of the upper clamping jaw.

The upper clamping jaw 11 has extending downwardly thereinto a plug 38 which may be of a metal tempered to a harder degree than the upper jaw 11 and the plug 38 is formed with a central bore or drill guiding opening 39. The insert 30 is formed with a drill guiding opening 40 aligning with the opening 39 so that a drill may be extended down through the guide opening 39 and the opening 40 for contact with the shank S of the bolt.

The lower jaw body 12 is formed with a drill guiding opening 41 aligning axially with the opening 39 and the insert 29 is also formed with a drill guiding opening 42 registering with the opening 41 and aligning with the openings 40 and 39.

In the use and operation of the drill jig or chuck hereinabove described, the upper jaw 11 is moved upwardly to an open position, the nut 25 being unthreaded on the shank 24 and the eye bolt 18 swung outwardly to a position disengaged from the lower jaw 10. The bolt shank S is then seated in the lower groove 31 with the threads of the shank S engaging the threads 33 of the lower insert 29. The head of the bolt is preferably positioned in contacting relation with the adjacent end of the insert 29 and the upper jaw 11 is then swung downwardly and the eye bolt 18 swung inwardly with the shank 24 engaging in the slot 26, of the lower jaw 10.

Before the nut 25 is turned to a fully clamping position, the bolt B is turned slightly to firmly tighten the bolt between the two inserts 29 and 30. The nut 25 may then be tightened so that the bolt B will be held against rotation between the two jaws 10 and 11. The drill is then extended downwardly through the guide openings 39 and 40, drilling a hole in the shank S in alignment with the holes of the inserts.

By providing the two inserts 29 and 30 with complementary threaded portions, the threaded portions of the inserts will interengage with the threads of the bolt shank so that when the drill cuts through the shank of the bolt the snug and tight engagement of the inserts with the threads of the bolt will eliminate any burrs in the opposite ends of the hole which is formed diametrically through the shank of the bolt.

The drill guiding openings in the upper and lower jaws and in the inserts are positioned at a predetermined distance with respect to one edge of each jaw so that when the bolt is tightly gripped between the jaws, and the head of the bolt contacts with the adjacent ends of the inserts, the hole formed through the shank of the bolt will be at the desired position with respect to the end of the shank of the bolt. This hole in the bolt is provided for receiving a cotter pin, locking wire or other means which is correlated with a slotted nut for locking the nut on the shank of the bolt.

Where it is desired to drill holes through different sizes of bolts, differently grooved inserts may be mounted in the channels or recesses 27 and 28 of the two jaws and the inserts may be of any desired length, that is, the inserts may either be flush with the adjacent sides of the two jaws or may project from the adjacent sides of the jaws, depending upon the length of the bolt to be drilled and the position of the hole in the bolt shank.

By providing a drill jig or chuck as hereinabove described, all burrs normally formed in drilling a bolt diametrically therethrough, particularly through threads, are eliminated so that these burrs will not tear the threads on the nut which is mounted on the bolt shank and will not damage any of the threads on the bolt shank inwardly from the end of the shank, as is the case where a burr is formed and the nut pulls the burr from the shank and drags the metal along the threads as the nut is threaded on the bolt shank.

What I claim is:

1. A drill jig or chuck for drilling an article without creating a burr, comprising a pair of article clamping jaws, each jaw having a recess therein, confronting article gripping inserts in said recesses, each insert having a groove formed with threads for a portion of the length thereof, means securing said inserts in said recesses, positioning means for accurately positioning said inserts in said recesses, and means for holding said jaws in clamping position, said jaws having axially aligned drill guide openings and said inserts having openings registering with said jaw openings.

2. A drill jig or chuck for drilling an article without creating a burr, comprising a pair of article clamping jaws, each jaw having a recess therein, confronting article gripping inserts in said recesses, each insert having a groove formed with threads for a portion of the length thereof, means securing said inserts in said recesses, a positioning pin carried by each jaw engageable with an inert for accurately positioning said insert in a recess, means for holding said jaws in clamping position, said jaws having axially aligned drill guide openings and said inserts having openings registering with said jaw openings, one of said jaws including a tempered plug formed with a drill guiding opening aligning with the opening of the other jaw.

FRED H. CAMERON.